Figure 1:
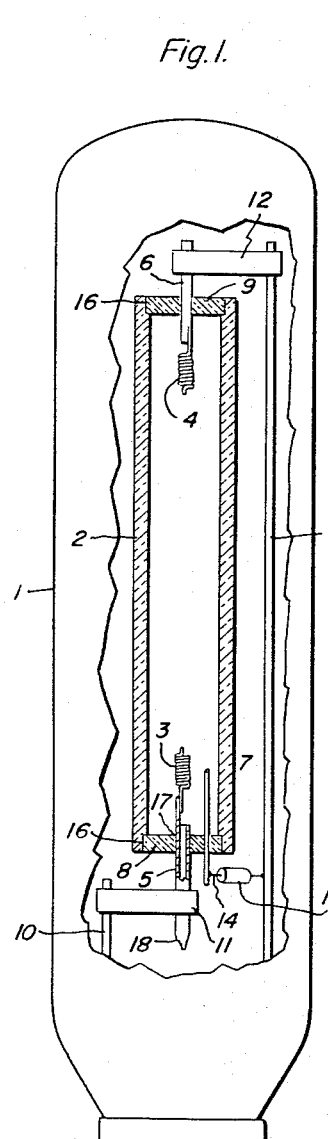

Jan. 9, 1968   P. D. JOHNSON   3,363,134
ARC DISCHARGE LAMP HAVING POLYCRYSTALLINE CERAMIC ARC TUBE
Filed Dec. 8, 1965

Inventor:
Peter D. Johnson,
by John F. Ahern
His Attorney.

United States Patent Office 3,363,134
Patented Jan. 9, 1968

3,363,134
ARC DISCHARGE LAMP HAVING POLYCRYSTAL-
LINE CERAMIC ARC TUBE
Peter D. Johnson, Schenectady, N.Y., assignor to General
Electric Company, a corporation of New York
Filed Dec. 8, 1965, Ser. No. 512,498
5 Claims. (Cl. 313—220)

The present invention relates to an improved electric arc discharge lamp of the type in which light is emitted from an arc in metallic vapor. More particularly, the present invention relates to such electric arc discharge lamps utilizing polycrystalline ceramic bodies as the arc tubes thereof.

In the electric arc lighting field, the mercury vapor lamp has long been a standard light source, although other metallic vapor arcs, as for example the low pressure sodium arc, have been utilized for the production of light. Recent developments have resulted in the production of electric arc discharge lamps that are greatly superior to the mercury vapor lamps in many if not all respects. Some of these new lamps are for example the metallic halide vapor lamp as disclosed in application Ser. No. 84,068 of G. H. Reiling, filed Jan. 23, 1961, now Patent No. 3,234,421, and the high pressure sodium vapor lamps of Kurt Schmidt, application Ser. No. 263,676, filed Mar. 1, 1963, now Patent No. 3,248,590, both of which are assigned to the assignee of the present invention. The trend as represented by the aforementioned new lamps is toward the utilization of higher temperatures and chemically active metals and their halides as the light emitting constituent of the electric lamp. The trend of development has resulted in a departure from the use of fused quartz in favor of polycrystalline ceramic bodies as the container within which the electric arc is maintained. One such ceramic is a sintered high density polycrystalline light-transmissive alumina consisting essentially of aluminum oxide and having a melting point of not less than 1925° C. This material is more particularly disclosed and claimed in U.S. Patent No. 3,026,210 to R. L. Coble.

In the fabrication of mercury vapor lamps utilizing fused quartz, well known and exhaustively developed techniques for making glass-to-metal seals and for passing electrode leads into the fused quartz envelope are utilized. With the new generation of lamps, however, and the utilization of polycrystalline ceramic arc-containing envelopes, difficulties are encountered which make the commercial production of such devices painstaking and expensive. One such difficulty lies in fabricating ceramic-to-metal seals which will withstand the high heat and the corrosive actions of the discharge metal and metal halides utilized.

Another different, but closely related, problem is that of providing means for sealing metal to ceramic so as to protect the seal from high temperatures at which the electric discharge operates so as to preclude mechanical failure of the seal due to heat influence thereupon.

Accordingly an object of the present invention is to provide improved lamp envelope structures which facilitate the construction of long-life, high quality, economical arc discharge envelopes utilizing ceramic materials and which may be fabricated with a minimum of difficulty and with relatively inexpensive material.

A further object of the present invention is to provide improved electric discharge arc lamps having discharge containing envelopes with ceramic bodies and with as small metal to ceramic seals as is practicable.

In accord with the present invention I provide metallic and metallic halide vapor discharge lamps having a discharge envelope fabricated from a polycrystalline ceramic material and closed with end wall members of the same ceramic material appropriately sealed to the main body of the envelope and having therein a plurality of small apertures for the passage of metallic electrical conductors and mechanical support members which are sealed to the end cap members with appropriate high temperature resisting sealing materials to form extremely small, simple, and inexpensively made seals between the metallic electrodes and the ceramic bodies.

The novel features which are believed characteristic of the present invention are set forth with particularity in the appended claims. The invention itself, however, both as to its organization and method of operation, as well as further objects and advantages thereof may best be understood from the following description taken in connection with the accompanying drawings in which:

FIGURE 1 illustrates an electric arc discharge device constructed in accord with the present invention in vertical view with parts broken away; and FIGURES 2 through 6 illustrate alternative embodiments of the discharge containing envelope seals of the device of FIGURE 1 which may be utilized in practicing the invention.

An arc discharge lamp constructed in accord with one embodiment of the present invention is illustrated in FIGURE 1 of the drawing. The lamp of FIGURE 1 includes an outer light-transmissive, generally vitreous envelope 1 having therein a second inner light-transmissive envelope 2. Envelope 2 contains therein a pair of oppositely disposed non-liquid arc-electrodes 3 and 4 which are supported within opposite ends of envelope 2 by electrode support members 5 and 6 respectively. A starting electrode 7 extends within one end of envelope 2 and terminates in a field emitting point immediately adjacent electrode 3. Electrodes 3 and 7 pass through and are sealed to a first end cap 8, while electrode 4 is passed through and sealed to a second end cap member 9. End cap members 8 and 9 are hermetically sealed to envelope wall 2 to form an evacuable envelope therewith. Envelope 2 is suspended within envelope 1 by a suspension assembly which comprises a pair of suspension pins 10 and a pair of suspension strap members 11 and 12. Suspension member 11 mechanically holds electrode support member 5 in its position and electrically connects the same to one terminal of a base member 13. Strap member 12 mechanically supports electrode support lead 6 within the envelope and electrically connects the same to a second terminal portion of base member 13. Starting electrode 7 is connected by lead wire 14 and resistor 15 to the support member 10 connected to arc electrode 4 (the arc-electrode at the opposite end of the arc tube).

The outer envelope of the lamp of FIGURE 1 may be conveniently constructed of a suitable hard glass that is utilized to maintain the operative portion of the lamp in a vacuum or in a protective atmosphere of, for example, an inert gas to prevent oxidation of leads and other deleterious effects of high temperature. The inner envelope is constructed of a translucent or transparent (within the visible spectrum) polycrystalline ceramic member capable of withstanding high temperatures of the order of 1200° C. to 1900° C. without chemical or physical deterioration. This temperature is the temperature of operation of the lamps of the aforementioned sodium vapor and metallic halide lamps and represents a temperature below which the material for construction of the inner envelope 2 should not fall. On the other hand, it does not represent any maximum operating temperature and it is within the contemplation of the present invention that so long as the ceramic material is transparent within the visible spectrum that its ability to withstand high operating temperatures may have no practical limitations as far as the present invention is concerned. Similarly this material should possess the characteristics of being substantially unaffected to any degree by chemical attack by a high temperature halide or active metal vapor maintained therewithin and including such reactive materials as sodium, lithium, cesium, for example, as well as less corrosive materials such as cadmium, barium strontium, scandium, calcium, gallium, indium, thallium, and zinc, and the halides thereof. One such material as mentioned hereinbefore is the high density alumina consisting of at least 99.5% of $Al_2O_3$ which is translucent and light-transmissive within the visible spectrum to the extent that no substantial loss in radiant output therefrom is suffered by absorption. Other suitable materials include light-transmissive polycrystalline refractory oxides such as titania, zirconia, yttria, thoria, dysprosia, and holmia based ceramics.

End cap members 8 and 9 are disc-shaped members having outside diameters substantially equal to the inside diameter of envelope 2 and are constructed from the same material thereof so that once being sealed thereto there is no difference in the thermal expansion characteristics thereof. The end caps are sealed to the envelope during fabrication by the application of a suitable sealing glass, the composition of which will depend upon the composition of the material from which the envelope 2 and end caps 8 and 9 are fabricated. In general the selection of an appropriate sealing glass to seal such ceramic members may readily be made once the materials being sealed is known. For example when the ceramic members are of the aforementioned 99.5% alumina, a calcium aluminate sealing glass may conveniently be used to form exceedingly rugged hermetic seals between envelope 2 and end cap members 8 and 9. As is shown in the drawing, electrode support members 5, 6, and 15 extend through and are sealed to end cap members 8 and 9.

In the fabrication of electric discharge lamp tubes made of ceramic materials which withstand high temperature arc activity it has been customary that the seal member be "butt-sealed" so that the actual seal is an annular contact between the ceramic member and a metallic end plate. An important reason for this type of seal is that it permits a backing ring to be sealed to the opposite end of the metallic end plate thus permitting the surrounding of the metallic end plate thus permitting the surrounding of the metallic end plate with ceramic members on both sides to minimize strains between the ceramic and the metal which strains are one of the most important factors in seal failure with changing temperatures due to differing thermal coefficients of expansion. There are disadvantages to be had in using the butt seal technique. Probably the most severe disadvantage encountered is that a very large area of seal is exposed to the corrosive atmosphere of the vaporized active metal and/or the vaporized active metal halide within the envelope. The resulting corrosion and failure of the seal has proven to be a major impediment to the fabrication of lamp structures from ceramic materials using this type seal.

In the copending concurrently filed application of G. H. Reiling entitled "Electric Discharge Lamp Structure," application Ser. No. 512,330, filed Dec. 8, 1965, and assigned to the assignee of the present invention, there is disclosed and claimed a lamp structure which minimizes this corrosion exposure by removing the actual ceramic to metal seal from the direct influence of the evaporated active metal or active metal halide and, at the same time lowering the temperature of the seal by a matter of 300 to 500° C. While this structure is effective to accomplish this, it still does not avoid another disadvantage of the ceramic envelope structure having a metallic end cap, namely the inability of having a third or starter electrode electrically insulated from both of the arc-electrodes within the lamp. This is because any electrode which is mechanically fixed to the end cap must also be electrically fixed thereto. In accord with the present invention both the disadvantages of the overexposure to corrosive atmospheres and the difficulty in inserting a starter electrode within the arc discharge tube is obviated by fabricating the end plates from a refractory translucent ceramic and making individual seals where each of the electrodes both starting and main arc electrodes pass through the end caps. The corrosion problem is minimized by the fact that the area of the seal that is exposed is only that line at which the seal separates the electrode wire or tube from the ceramic end cap.

In accord with another advantage of the present invention I make use of a principle which is embodied in the aforementioned concurrently filed application of G. H. Reiling, namely the formation of a pool of molten metal or halide which sustains the arc as a barrier between the actual seal and the corrosive atmosphere. Thus, if the annular seal which surrounds the electrode support member or tube begins to deteriorate and the seal material is eroded away, a small dimensioned annular cavity will surround the electrode that is bounded on the inner periphery thereof by the ceramic of the end cap. Since the width of this cavity will be very small at any given point and since this is, in all probability, the coldest point within the arc tube, vaporized metal or metallic halide will tend to condense thereat and fill the annular region so as to effectively protect the remaining portion of the seal from the corrosive atmosphere.

The actual sealing of the electrode support members within the end caps is accomplished by the use of a suitable sealing glass such as is utilized to seal end cap members 8 and 9 within envelope 2 and may be chosen in accord with the same criteria. Additionally a suitable metallizing substance is added to the sealing glass in order to form a suitable glass to metal sealing compound. This compound is then mixed into a slurry and painted into the holes and upon the electrode support members immediately prior to inserting the device into a furnace for baking and sealing. A suitable seal may be made to niobium electrode support rods or tubes utilizing calcium aluminate sealing glass mixed with magnesium oxide and with a hydride of zirconium, titanium, or tungsten. For other suitable combinations of ceramic material and metallic lead material other suitable sealing glass well known to the art may be utilized. While niobium is a metal commonly used with such seals, due to its thermal characteristics, the present invention makes it possible to use less expensive metals such as Fernico or tungsten. Added cost savings result from removal of the necessity of the expensive and time consuming process for forming shaped niobium end caps.

Figure 2:
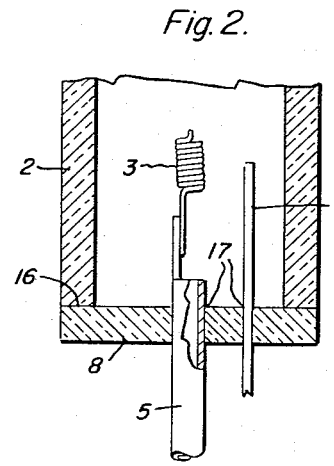

As is illustrated in FIGURE 1, one electrode support member 5, in this instance the lower electrode support member, is tubular rather than solid and is utilized as means for charging and evacuating envelope 1 prior to seal-off. In the preparation of the device as illustrated in FIGURE 2, the inner envelope is prepared by forming the ceramic-to-ceramic seals illustrated at 16 and the ceramic-to-metal seals illustrated at 17 by firing of the constituents in a suitable furnace at a temperature of about 1400° C. for about one hour, for example, after having painted a slurry of an appropriate sealing glass with or without added metallic or metallic hydride components therein depending upon whether the seal is a ceramic-to-ceramic or a ceramic-to-metal seal as discussed hereinbefore. All seals may be made simultaneously. Upon sealing of the envelope the material which is to be used to support the discharge, such as mercury and either a reactive metal such as sodium or a reactive metal halide such as sodium iodide is metered through electrode support tubulation 5 in liquid or pellet form, tubulation 5 is connected to a suitable exhaust pump and the pressure therein is lowered to an appropriate value, a suitable filling of a starting gas as, for example, argon at 20 mm. of mercury pressure, is metered into the tube and the tube is pinched off at 18 to provide an hermetically sealed inner envelope containing a starting atmosphere of an inert gas and a suitable solid or liquid which will be vaporized under the heat of the arc in the starting gas upon operation of the lamp.

It will be noted that, in FIGURE 1, the ceramic end cap members 8 and 9 are sealed at the end of envelope 2 and are disc-shaped members having an outside diameter slightly larger than the inside diameter of envelope 2 and that a counterbore has been made at the immediate end adjacent regions thereof in order to accommodate the end cap members. This construction is quite advantageous in that the greater portion of the ceramic-to-ceramic seal is offset from the discharge region. Alternative structures may, however, be utilized. In FIGURE 2 of the drawing, one such alternative is illustrated. In FIGURE 2 only the lower portion of the inner envelope 2 is illustrated and like numerals are used to identify like parts. In FIGURE 2, ceramic-to-ceramic seal 16 is made by a butt seal technique in which the outside diameter of the disc-shaped end piece is essentially the same as the outside diameter of ceramic envelope 2.

Figure 3:
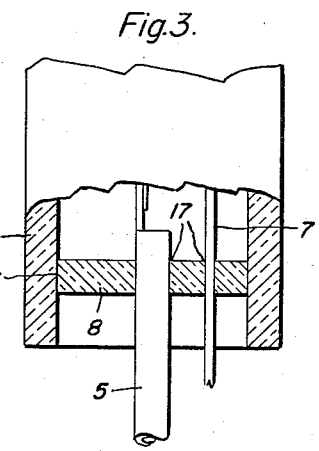
Figure 4:
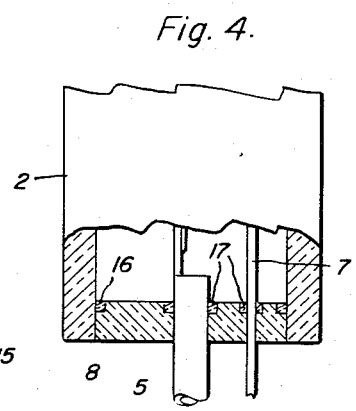

In FIGURE 3 of the drawing, another embodiment is illustrated in which the seal 16 is cylindrical and constitutes the interface between a ceramic end plate 8 which is inserted within the inner diameter of envelope 2. In FIGURE 4 of the drawing, the end cap member 8 is substantially equal in diameter to the inner diameter of arc tube 2, but the tube is positioned so as to be flush with the end face of envelope 2 and fillets are provided adjacent the ceramic-to-ceramic seals and the metal-to-ceramic seals 16 and 17 respectively for the incorporation of an added quantity of sealing glass so as to provide added resistance to deterioration and protection of the inner portions of the seal from the corrosive influences of the arc discharge.

Figure 5:
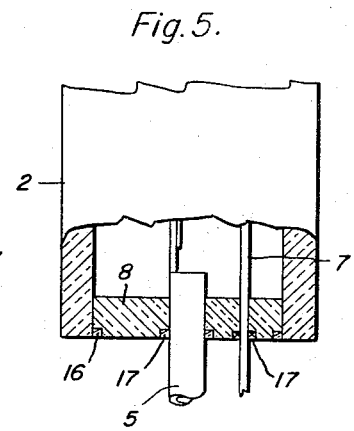
Figure 6:
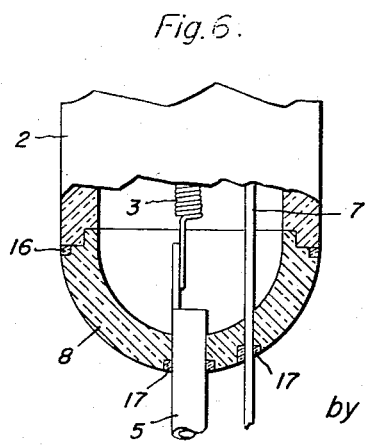

In FIGURE 5 of the drawing, another embodiment utilizes the fillets surrounding the ceramic-to-ceramic seals and the metal-to-ceramic seals 16 and 17 respectively, but these fillets are located external of the interior tube so as to facilitate fabrication, the sealing glass being applied from the outside of the tube after the device is actually assembled and is ready for firing and sealing. In FIGURE 6 of the drawing another embodiment of the end cap seal structure utilizes a hemispherical end cap. This structure has the advantage of the maintenance of more uniform temperatures in the arc tube, since there are no secluded corners into which cooler constituents of the arc discharge may migrate, thus causing condensation and undesirable temperature gradients within the inner bulb wall 2. In FIGURE 6 the end cap 8 is butt-sealed by seals 16 to envelope wall 2 and suitable collars are provided upon each member to cause an interleaved fit. Fillets are also used external of the seals to provide improved seals and accessibility from the outside immediately prior to firing. Metal-to-ceramic seals 17 in this embodiment are essentially the same as those provided in the embodiment of FIGURE 5.

While the invention has been set forth herein with respect to certain particular embodiments, it is obvious that many further modifications, changes and embodiments may be developed by those skilled in the art. Accordingly it is intended that appended claims will be directed to all such modifications and changes and other embodiments as fall within the true spirit and scope of the present invention.

What I claim as new and desire to secure by Letters Patent of the United States is:

1. An electric arc lamp comprising a base member having a plurality of electrical contacts and an exterior light-transmissive envelope attached thereto; a second inner light-transmissive envelope suspended within said first envelope and comprising a tubular light-transmissive polycrystalline refractory oxide body, a pair of apertured end cap members of the same light-transmissive polycrystalline refractory oxide as said tubular body closing opposite ends of said body and hermetically sealed thereto, at least a pair of arc-electrodes contained within said inner envelope and mounted on support rods which are hermetically sealed through said end caps to provide an hermetically sealed envelope, and a charge of a starting gas and a vaporizable light-emitting substance selected from the group consisting of active metals and active metal halides within said envelope; and means for mechanically supporting said inner envelope within said outer envelope and for electrically connecting said arc-electrodes to respective contacts on said base member.

2. The lamp of claim 1 wherein a starting electrode terminating in a field emitting point closely juxtaposed to one of said arc-electrodes is passed through and sealed within one of said end caps.

3. The lamp of claim 1 wherein the inner envelope wall and the end caps are fabricated by a polycrystalline high density ceramic which is translucent in the visible spectrum and is composed of at least 99.5% $Al_2O_3$ and the sealing glass used is calcium aluminate.

4. The lamp of claim 1 wherein the vaporizable atmosphere therein during operation is composed of sodium vapor at a pressure of 30 to 1000 mm. of Hg and mercury vapor at a pressure of 1–15 atmospheres.

5. The lamp of claim 1 wherein the vaporizable atmosphere during operation is composed of at least one halide of a metal selected from the group consisting of sodium, lithium, potassium, cesium, cadmium, barium, strontium, scandium, calcium, gallium, indium, thallium, thorium, and zinc at a pressure of $10^{-3}$ to $10^3$ mm. Hg.

References Cited

UNITED STATES PATENTS

| | | | |
|---|---|---|---|
| 2,151,885 | 3/1939 | Baier | 313—317 |
| 2,561,898 | 7/1951 | Willoughby | 313—220 X |
| 2,682,009 | 6/1954 | Fraser | 313—220 |
| 2,971,110 | 2/1961 | Schmidt | 313—221 |
| 3,054,922 | 9/1962 | Louden et al. | 313—221 X |
| 3,088,201 | 5/1963 | Louden et al. | 29—471.9 |
| 3,234,421 | 2/1966 | Reiling | 313—27 X |

JAMES W. LAWRENCE, *Primary Examiner.*

S. A. SCHNEEBERGER, *Assistant Examiner.*